(12) United States Patent
Morris

(10) Patent No.: US 6,345,690 B1
(45) Date of Patent: Feb. 12, 2002

(54) TREE STAND

(76) Inventor: Phillip E. Morris, 1301 Jane La., Greenwood, MS (US) 38930

(*) Notice: Subject to any disclaimer, the term of this patent is extended or adjusted under 35 U.S.C. 154(b) by 0 days.

(21) Appl. No.: 09/543,976

(22) Filed: Apr. 5, 2000

(51) Int. Cl.[7] .............................. A63B 27/00; E04G 3/00
(52) U.S. Cl. ...................................... 182/136; 182/188
(58) Field of Search ................................. 182/116, 120, 182/134, 135, 136, 187, 188

(56) References Cited

U.S. PATENT DOCUMENTS

| | | | |
|---|---|---|---|
| 3,856,111 A | 12/1974 | Baker | 182/135 |
| 4,137,995 A | 2/1979 | Fonte | 182/135 |
| 4,168,765 A * | 9/1979 | Ferguson et al. | 182/135 |
| 4,230,203 A | 10/1980 | Sweat et al. | 182/134 |
| 4,316,526 A | 2/1982 | Amacker | 182/135 |
| 4,331,216 A | 5/1982 | Amacker | 182/135 |
| 4,606,142 A | 8/1986 | Reneau | 43/1 |
| 4,726,447 A | 2/1988 | Gibson et al. | 182/135 |
| 4,802,552 A | 2/1989 | Williams | 182/187 |
| 4,890,694 A | 1/1990 | Williams | 182/187 |
| 4,942,942 A | 7/1990 | Bradley | 182/187 |
| 4,969,538 A | 11/1990 | Amacker | 182/187 |
| 4,987,972 A * | 1/1991 | Helms | 182/187 |
| 4,989,766 A | 2/1991 | Lewallyn et al. | 224/155 |
| 5,016,733 A | 5/1991 | Bradley | 182/187 |
| 5,052,516 A | 10/1991 | Jamieson | 182/135 |
| 5,060,756 A | 10/1991 | D'Acquisto | 182/187 |
| 5,097,925 A | 3/1992 | Walker, Jr. | 182/135 |
| 5,156,236 A | 10/1992 | Gardner et al. | 182/187 |
| 5,226,505 A * | 7/1993 | Woller et al. | 182/187 |
| 5,234,077 A | 8/1993 | Sheriff | 182/187 |
| 5,314,042 A * | 5/1994 | Adams | 182/187 |
| 5,398,779 A * | 3/1995 | Meyer | 182/187 |
| 5,492,198 A | 2/1996 | Williams | 182/136 |
| 5,628,383 A | 5/1997 | McIntyre | 182/187 |
| 5,641,036 A | 6/1997 | Maxwell | 182/135 |
| 5,971,104 A | 10/1999 | Woller | 182/136 |
| 5,996,738 A * | 12/1999 | Nelsen | 182/135 |

OTHER PUBLICATIONS

"The Performer 1000™ Climbing Tree Stand," advertisement, Black Panther Treestands, no date. No date available.

* cited by examiner

Primary Examiner—Daniel P. Stodola
Assistant Examiner—Hugh B. Thompson
(74) Attorney, Agent, or Firm—Kenyon & Kenyon

(57) ABSTRACT

A climbing tree stand. In one embodiment, the tree stand includes a first platform and a second platform. The first and second platforms include a base frame, a first arm and a second arm, a support arm, first and second illumination assemblies, and a blade attached to an upper bracket of the base frame. The first and second arms are pivotally attached to the base frame and are releasably engageable with the support arm. The support arm includes curved portions at opposed distal ends thereof. The first illumination assembly is attached to a distal end of the first arm and the second illumination assembly is attached to a distal end of the second arm of each platform. The second platform includes a foot support lifting bracket attached to its base frame. The foot support lifting bracket is comprised of a rigid, non-flexible structure.

24 Claims, 10 Drawing Sheets

TREE STAND

BACKGROUND OF THE INVENTION

1. Field of the Invention

The present invention relates generally to a tree stand. More specifically, the invention provides a climbing tree stand that can be utilized for hunting.

2. Description of the Related Art

Generally, climbing tree stands that consist of a first upper support and a second lower support are known. The upper support generally includes a seating apparatus for accommodating a seated hunter and the lower support generally includes a foot support platform for supporting the legs of the hunter when seated in the climbing tree stand. As is generally known, the hunter is able to climb a tree with the tree stand by alternately raising the upper support and the lower support as the climber climbs the tree in order to position it on the trunk of the tree to obtain a favorable hunting position. U.S. Pat. No. 4,230,203 generally describes these types of tree stands. However, there are problems with known climbing tree stands.

One of the problems with known tree stands is the physical structural configurations of the support platforms. The physical structures of the platforms result in platforms which, when disassembled for carrying and transport by the hunter, are large and thus difficult to carry and transport. One particular problem with the structural configuration of known climbing tree stands can be seen in the '203 patent. As can be seen in the '203 patent, in order to secure the platforms around the tree, a blade 80, for example, of the upper platform extends around an opposed side of the tree. The blade 80 is secured to arms 78 by utilizing connection hardware, such as threaded fasteners 50. As can be seen, blade 80 is formed in a v-shaped configuration. An aperture is located at each end of blade 80 which aligns with an appropriate aperture included within arms 78. Because the platforms may possibly be positioned around trees of varying sizes, arms 78 must be elongated such that they can include multiple apertures within them for joining with blade 80. The apertures in blade 80 are aligned with appropriate apertures in arms 78 to accommodate a tree of a particular width. Whereas this may not present a particular problem when the support platforms are positioned on the trees, when the platforms are disassembled for carrying and transport by the hunter, these long arms 78 present drawbacks. The extended length of arms 78 results in a large structure which is difficult to carry and transport. Therefore, it would be desirable to provide a platform that has a more compact configuration when disassembled for carrying and storage purposes.

Another problem with known tree climbing stands is the difficulty that is associated with assembling the stands by the hunter. As described above, for example, in order to assemble both the upper and lower platforms of the tree stand, the hunter must connect blade 80 with arms 78 by utilizing connection hardware. The hunter must align the apertures in blade 80 with one of the apertures included in each of arms 78 and insert connection hardware within the aligned apertures to secure blade 80 to arms 78. Whereas this may not appear to be a difficult procedure, assembly of the deer stand is usually accomplished in the early morning hours before sunrise. Thus, the hunter is required to assemble the platforms in darkness. In order to try to ease the task of assembling the platform, the hunter may utilize artificial lighting, such as a flashlight. However, it is difficult for the hunter to both hold and/or position the flashlight while still trying to maneuver, position, and assemble the platform together. Thus, there is a need for an improved method for assembling the deer stand in the environment in which the hunter is usually required to assemble the deer stand.

Another problem with known tree climbing stands is the requirement for the hunter to engage the lower platform with his/her feet in order to lift the lower platform with his/her legs as the hunter is climbing the tree with the upper and lower platforms. Known devices for allowing the hunter to engage the lower platform with his/her boots present drawbacks. U.S. Pat. No. 4,137,995 illustrates a known apparatus for allowing the hunter to engage the lower platform with his/her boots. As can be seen in the '995 patent, feet engaging elements 66 are provided on the lower climbing platform 12. Each foot engaging element 66 includes a foot hold 68 which is fixedly attached to the upper surface of foot support member 64. Feet engaging element 66 also includes adjustable straps 70 to secure the hunter's feet to the lower climbing platform 12. However, drawbacks exist with this particular device and with other known devices. Because these known devices are comprised of flexible elements, e.g., leather straps, the component parts of the foot holding devices may not adequately maintain their form when the hunter does not have his/her boots within the devices. Thus, when the hunter is trying to position his/her feet within the device when beginning to climb the tree, the device's form may have collapsed and it could be difficult for the hunter to position his/her feet within the device. Additionally, the securing straps which extend around the back of the hunter's boots to retain the hunter's boots within the device are also flexible. These straps may be difficult for the hunter to appropriately position for entry into and be difficult for securing around his/her boots since they require the hunter to buckle the straps around the boots. Thus, for these and other reasons, there are problems with known foot holding devices.

Still another problem with known tree climbing stands is that it is difficult to package the two disassembled platforms together in order to provide for ease of carrying and transporting the platforms for the hunter. Generally, it is known to merely attempt to stack the two platforms on top of each other and just secure the platforms together by wrapping the stacked platforms with a rope-type of securing mechanism. Whereas this may provide for securing the two platforms together, the platforms are not directly inter-engaged and may easily become separated due to these inefficient securing mechanisms. Whereas it is also known to join an upper platform to a lower platform by utilizing pin structures on one of the platforms which are inserted into corresponding pin openings on the other of the platforms, this type of device has drawbacks due to the difficulties that can be encountered when trying to align the pins with the openings, particularly in the hunter's environment.

Still yet another disadvantage of known tree climbing stands is that a blade that is included on the platforms which engage the tree on the platform side of the tree, i.e., on the side of the tree that is opposed from the side of the tree that is engaged by blade 80 in the '203 patent, is generally formed in multiple pieces. That is, the blade is generally formed in at least two pieces that are disposed apart from each other on the platform with a gap included between the two pieces. Whereas this configuration may be adequate for engaging trees of a larger width, i.e., both pieces of the blade are able to engage with the large width tree, this configuration is not adequate for engaging trees with smaller widths. If this two-piece configuration is attempted to be utilized with smaller diameter trees, the tree trunk would be positioned in the slot or opening between the two blade pieces and thus the blades would not be able to engage with the tree. Thus, the known designs for these blade pieces are not adequate for use with all sizes of trees. Additionally, because the blade is formed in two or more pieces, the blade may not be as rigid a structure as is desired and does not provide for as much stability of the platform against the tree as may be desired.

Therefore, because of the above-described drawbacks of known tree stands and for other drawbacks that are associated with currently known tree stands but which have not been specifically addressed herein, it is desirable to provide for an improved climbing tree stand.

SUMMARY OF THE INVENTION

A tree stand is provided. In an embodiment for a tree stand in accordance with the principles of the present invention, the tree stand includes a first platform and a second platform. The first and second platforms include a base frame, a first arm and a second arm, a support arm, first and second illumination assemblies, and a blade attached to an upper bracket of the base frame. The first and second arms are pivotally attached to the base frame and are releasably engageable with the support arm. The support arm includes curved portions at opposed distal ends thereof. The first illumination assembly is attached to a distal end of the first arm and the second illumination assembly is attached to a distal end of the second arm of each platform. The second platform includes a foot support lifting bracket attached to its base frame. The foot support lifting bracket is comprised of a rigid, non-flexible structure.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
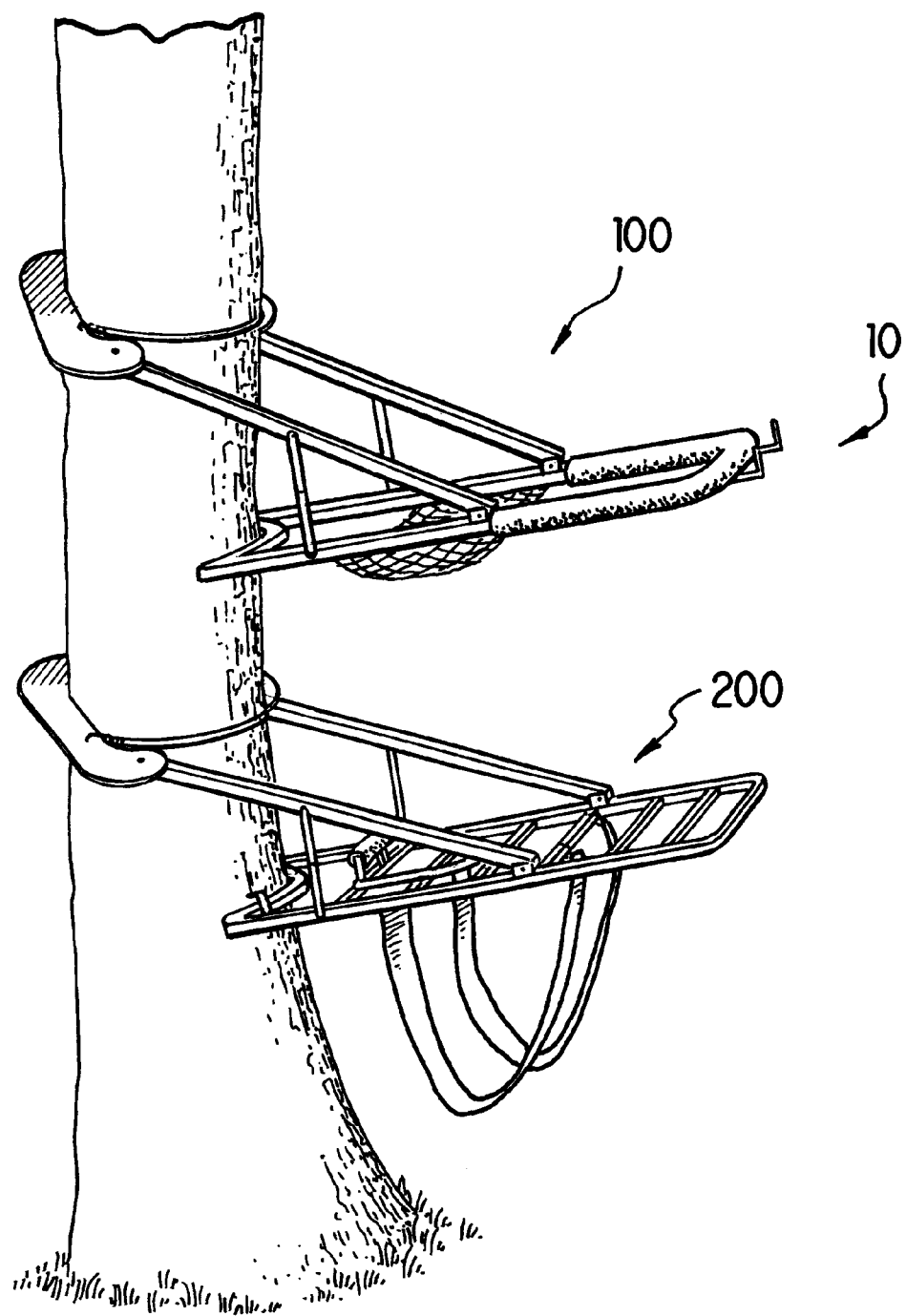
FIG. 1 illustrates an embodiment for a climbing tree stand in accordance with the principles of the present invention.

FIG. 1 illustrates a first embodiment of the climbing tree stand of the present invention. As can be seen, climbing tree stand 10 consists of an upper platform 100 and a lower platform 200. The upper platform 100 supports the hunter when in a seated position and the lower platform 200 supports the feet of the hunter, i.e., the hunter is able to stand on lower platform 200 and sit on upper platform 100. As is known, and as discussed previously, the hunter is able to climb to a desired height in a tree with the tree stand by alternately raising the upper platform 100 and the lower platform 200.

Figure 2:
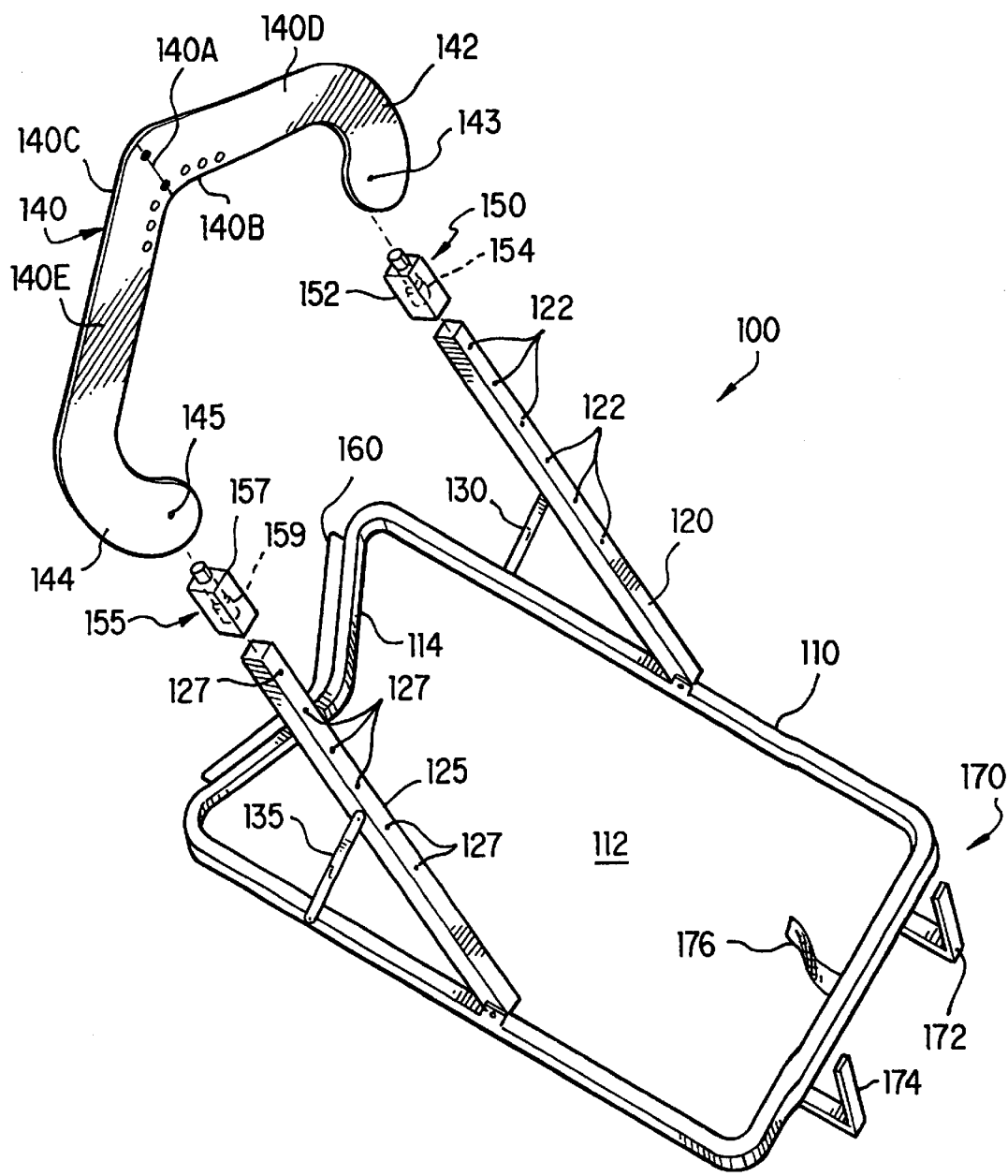
FIG. 2 is a partially exploded perspective view of an embodiment of an upper platform in accordance with the principles of the present invention.

FIG. 2 further illustrates upper platform 100 in accordance with the principles of the present invention. As can be seen, upper platform 100 includes a base frame 110, first and second arms 120, 125, respectively, support arm, or blade, 140, illumination assemblies 150, 155, a blade 160, and a gun rack 170. As discussed previously, upper platform 100 supports a seated hunter. The hunter sits within seating area 112 of base frame 110. An embodiment for a seating mechanism of the present invention will be provided later in this specification in connection with FIG. 11.

Base frame 110 is generally a rectangular structure that may be comprised of aluminum tubular framing members. In an embodiment, base frame 110 has a length of approximately 33¼ inches and a width of 23½ inches. First arm 120 and second arm 125 are pivotally attached to base frame 110 and are able to pivot between a raised position (as illustrated in FIG. 2) and a folded position where the arms lie parallel to base frame 110. Locking hinges 130 and 135 assist in pivoting and locking arms 120, 125, respectively.

Figure 3:
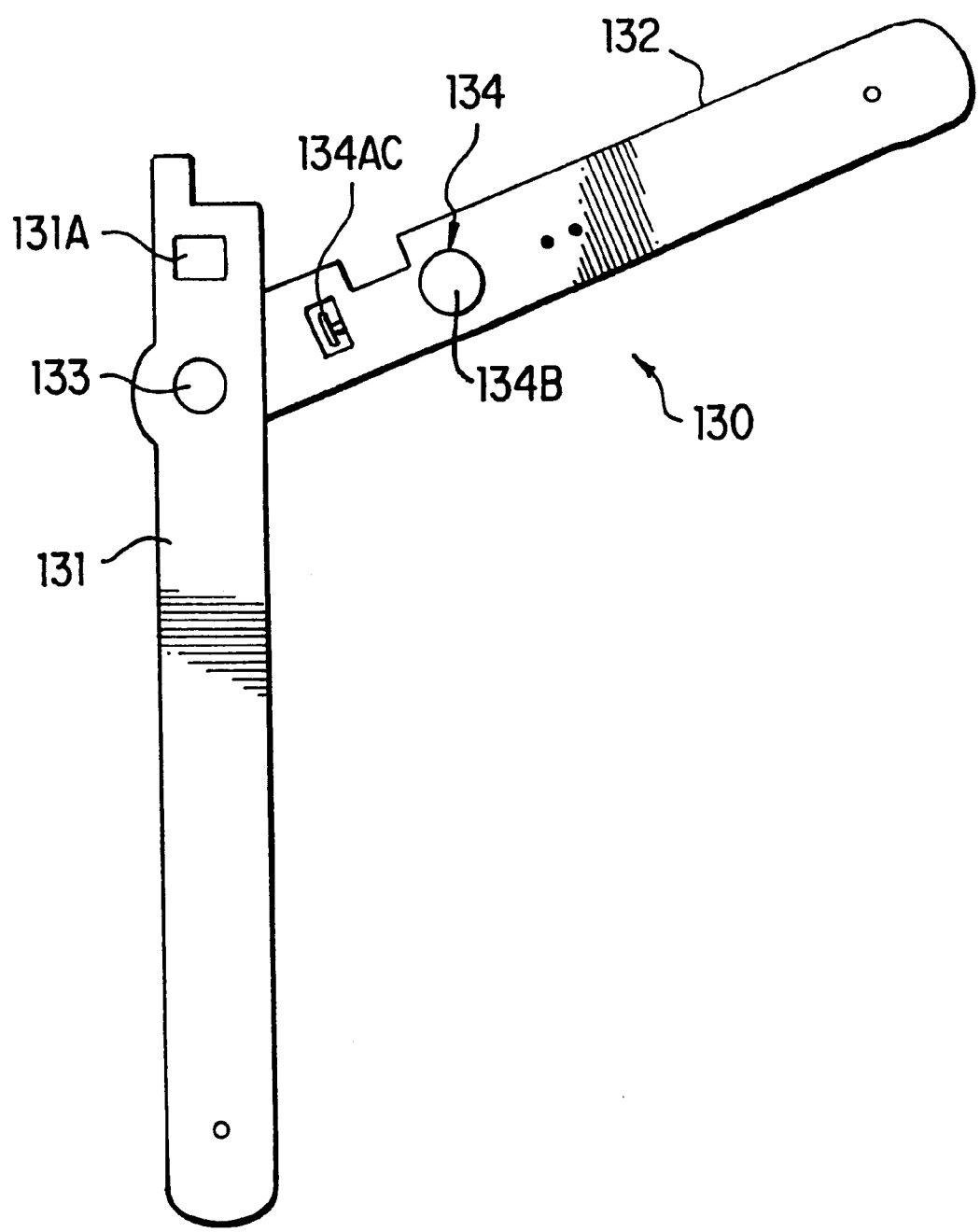
FIG. 3 illustrates an embodiment of a locking hinge in accordance with the principles of the present invention.
Figure 4:
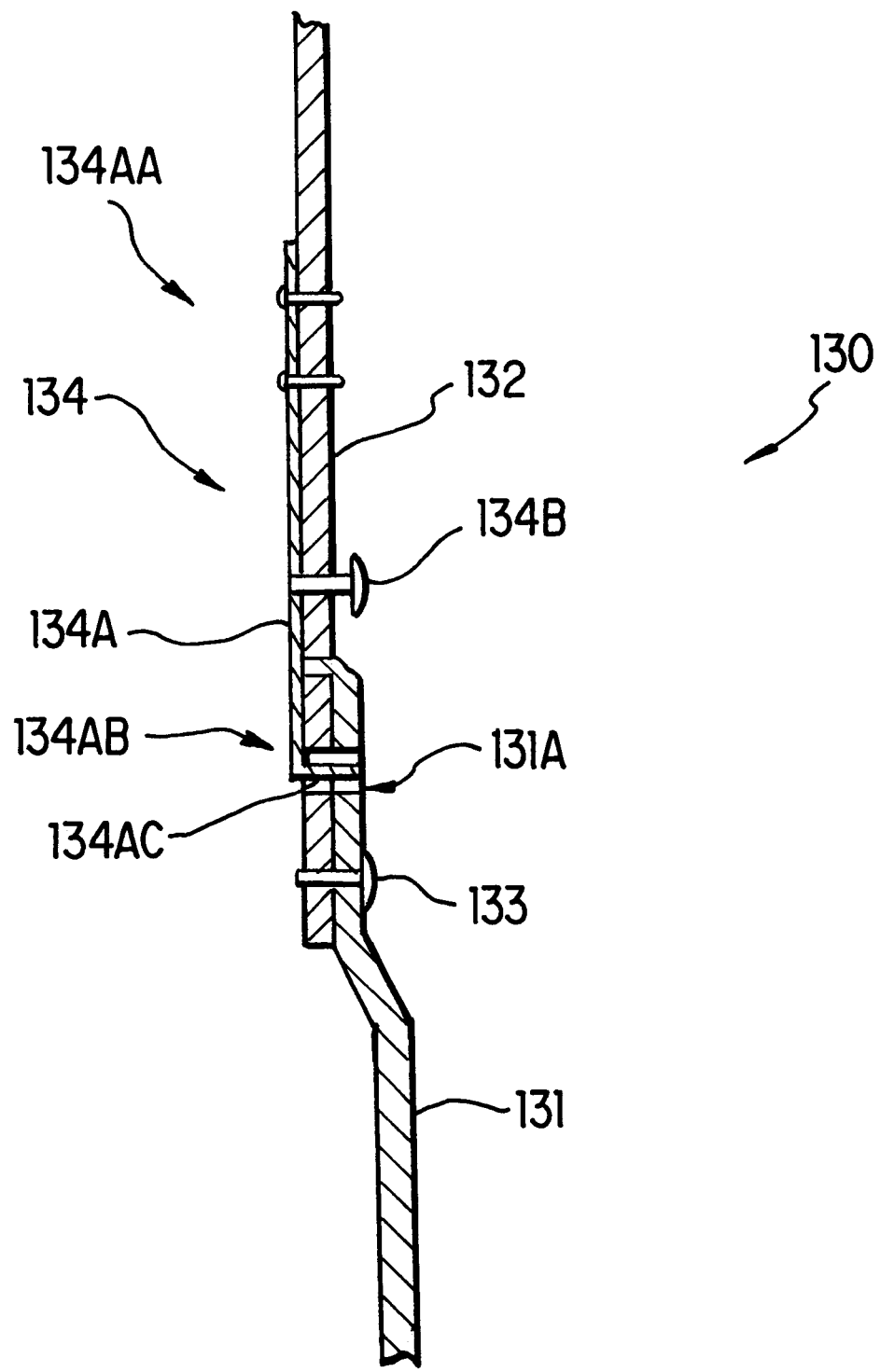
FIG. 4 is a cross-sectional view of the locking hinge of FIG. 3.

FIGS. 3 and 4 illustrate an embodiment for a locking hinge in accordance with the principles of the present invention. Whereas only locking hinge 130 is illustrated in FIGS. 3 and 4, locking hinge 135 is similarly formed. Locking hinge 130 is comprised of a first support member 131 and a second support member 132. Second support member 132 is pivotally attached to first support member 131 by pin 133. An aperture 131A is included in first support member 131. A lock 134 is included on second support member 132. Lock 134 includes leaf spring 134A. A first end 134AA of leaf spring 134A is connected to second support member 132. A second end 134AB of leaf spring 134A includes locking head 134AC which, in a locking position, extends through an aperture included in second support member 132 and through aperture 131A of first support member 131 to lock second support member 132 to first support member 131 to retain arm 120 in its extended position with respect to base frame. A push pin 134B is connected to leaf spring 134A and extends through an aperture included in second support member 132.

As can be understood, to lock second support member 132 to first support member 131, pressure is applied to push pin 134B to remove locking head 134AC from the aperture in second support member 132. The second support member 132 is then aligned with first support member 131. Pressure is then released from push pin 134B which then allows leaf spring 134A to return locking head 134AC through the aperture included in second support member 132 and into aperture 131 A included in first support member 131. To unlock second support member 132 from first support member 131, pressure is applied to push pin 134B to flex leaf spring 134A away from second support member 132, thus removing locking head 134AC from the apertures included in the first and second support members. The first and second support members may then be pivoted with respect to each other to collapse first arm 120 such that it lies parallel to base frame 110.

In continuing further with the discussion of the components of upper platform 100, first arm 120 includes a plurality of apertures 122 and second arm 125 also includes a plurality of apertures 127. Support arm 140 also includes apertures 143 and 145 which align with respective apertures on the first and second arms to provide for securing support arm 140 to arms 120 and 125 with connection hardware.

As mentioned above, upper platform 100 includes support arm 140. As can be understood, support arm 140 is positioned around an opposing side of the tree from that which engages blade 160 of base frame 110, as will be explained later in this specification. As can be seen, support arm 140 includes a v-shaped portion with curved portions provided at each end of the v-shaped portion. Thus, support arm 140 includes first curved portion 142 and second curved portion 144. Each curved portion provides for a continuous curvature in the structure which defines support arm 140 at its distal ends. The present invention is not limited to any particular radius of curvature for each curved portion nor is a single radius of curvature required for each curved portion. However, each curved portion consists of a continuously curved configuration for the distal ends of support arm 140. An aperture is included at a distal-most end of each curved portion at a distance of approximately 1 inch from the end of the curved portion.

Thus, first curved portion 142 includes aperture 143 at its distal-most end and second curved portion 144 includes aperture 145 at its distal-most end.

As will be further explained later in this specification, the configuration of support arm 140 with curved portions at its distal ends provides for a more-compact configuration for the upper platform 100 when the upper platform is disassembled and packaged for carrying and transport by the hunter. Because support arm 140 is not just merely configured in a v configuration with two straight arms forming the v-shape, as is known in the prior art, but rather, includes the curved portions at its distal-most ends, the apertures 143 and 145 may be extended a distance from the straight portions of support arm 140. This, in-turn, allows the lengths of first arm 120 and second arm 125 to be shortened in comparison to the prior art. In effect, a length is able to be reduced from arms 120, 125 because this length has been added to support arm 140. Thus, when the upper platform 100 is disassembled and configured for transport, the reduced length of arms 120 and 125 provide for a more-efficient carrying and transport package. As discussed above, the length that is taken off of first arm 120 and second arm 125 is added to support arm 140. Because support arm 140 is disassembled from arms 120 and 125 when upper platform 100 is configured for carrying and transport, the added length to support arm 140 is able to be packaged within the other disassembled structure of upper platform 100 and thus does not result in an extension of the disassembled structure of upper platform 100 as is the case when the additional length is included on first and second arms 120, 125, respectively.

Due to the complimentary configurations between support arm 140 and first and second arms 120, 125, as discussed above, the length of arms 120, 125 may be reduced.

Thus, a representative length for arms 120, 125 in the present invention is 28¾ inches. Thus, the provision of support arm 140 in the present invention with curved portions provided at each end of support arm 140 provides for a more compact disassembled configuration for upper platform 100 which provides utility for the hunter when trying to carry and transport the disassembled upper platform.

It is advantageous to include a curved configuration on support arm 140 for extending the length that apertures 143 and 145 may be carried on support arm 140, rather than including an extension piece that is formed at a discrete angle with respect to the v-shaped portion of the support arm, in order to provide for increased strength for these additional length portions of support arm 140. The continuous curved configuration for the extended length portions of support arm 140 provide inherent strength due to this continuous curved configuration. The continuously curving configuration of the extended length portions provide strength all along the curved portion and thus there are no discrete and/or acute angles included in the support arm, at which stresses and forces could concentrate which could cause the support arm's structure to fail under the weight of the hunter and which could have catastrophic consequences.

Another advantage of a continuous curved configuration for support arm 140 is that it provides more points of contact, i.e., over a greater surface area, between the arm 140 and the tree trunk. The continuous curved configuration more nearly resembles the configuration of the tree trunk, which allows for more contact between the support arm and the tree trunk when compared to merely v-shaped arms and/or v-shaped arms formed with extension pieces at a discrete angle. The continuously curved configuration allows for continuous contact between the tree and the support arm along a longer length, e.g., the entire inner surface of the support arm.

The continuous curved configuration for support arm 140 will be further discussed later in his specification in connection with the lower platform 200, which will be described in connection with FIG. 6.

Representative dimensions for support arm 140 are a width of 28½ inches with a depth of 16¼ inches. The width of the structural member(s) which comprises support arm 140 is 3 inches.

In order to further advantageously configure the configuration of support arm 140, an adjustment joint 140A may be provided at a center location of support arm 140 which would allow for variable orientation of the inner surface 140B of support arm 140 with respect to the outer surface 140C, which would allow for the v-shaped portion of support arm 140, and thus the physical relationship of the curved portions with respect to the v-shaped portion, to be adjusted to better accommodate a tree of a particular width. In this embodiment, support arm 140 would be formed in two pieces 140D, 140E and adjustment joint 140A would pivotally join the two pieces. Joint 140A could be comprised of a pivot member disposed through the two pieces of the support arm at a position near the outer surface 140C to pivotally join the two pieces together and an adjustable mating mechanism, such as a pin disposable though respective apertures in each support arm piece and thus adjustable along the pieces near the inner surface 140B, to join the two pieces together at their inner surfaces after the two pieces have been pivoted to form a more-advantageous shape to accommodate a particular tree.

Upper platform 100 also includes illumination assemblies 150, 155. First illumination assembly 150 includes an enclosure 152 and a flashlight 154, which is included within enclosure 152. Likewise, second illumination assembly 155 includes an enclosure 157 and a flashlight 159, which is also included within enclosure 157. Each illumination assembly is associated with an end portion of one of the arms 120, 125 and is provided to internally illuminate the inner area of the respective arm which in-turn illuminates the apertures within each arm. Thus, the illumination assemblies allow the hunter to be able to easily locate the apertures within arms 120, 125 and thus easily align an aperture within support arm 140 with a respective aperture within arms 120, 125 for assembling support arm 140 to arms 120, 125. Also, because the illumination assemblies are physically associated with each arm, the hunter is not required to hold and position the flashlights while also trying to assemble the upper platform. Therefore, not only do the illumination assemblies provide for visualization of the apertures in the arms and support arm, but the illumination assemblies also provide for positioning and holding the illumination devices within the illumination assemblies and platforms. Since both of the illumination assemblies are similarly formed, a detailed description will only be provided for illumination assembly 150.

Figure 5:
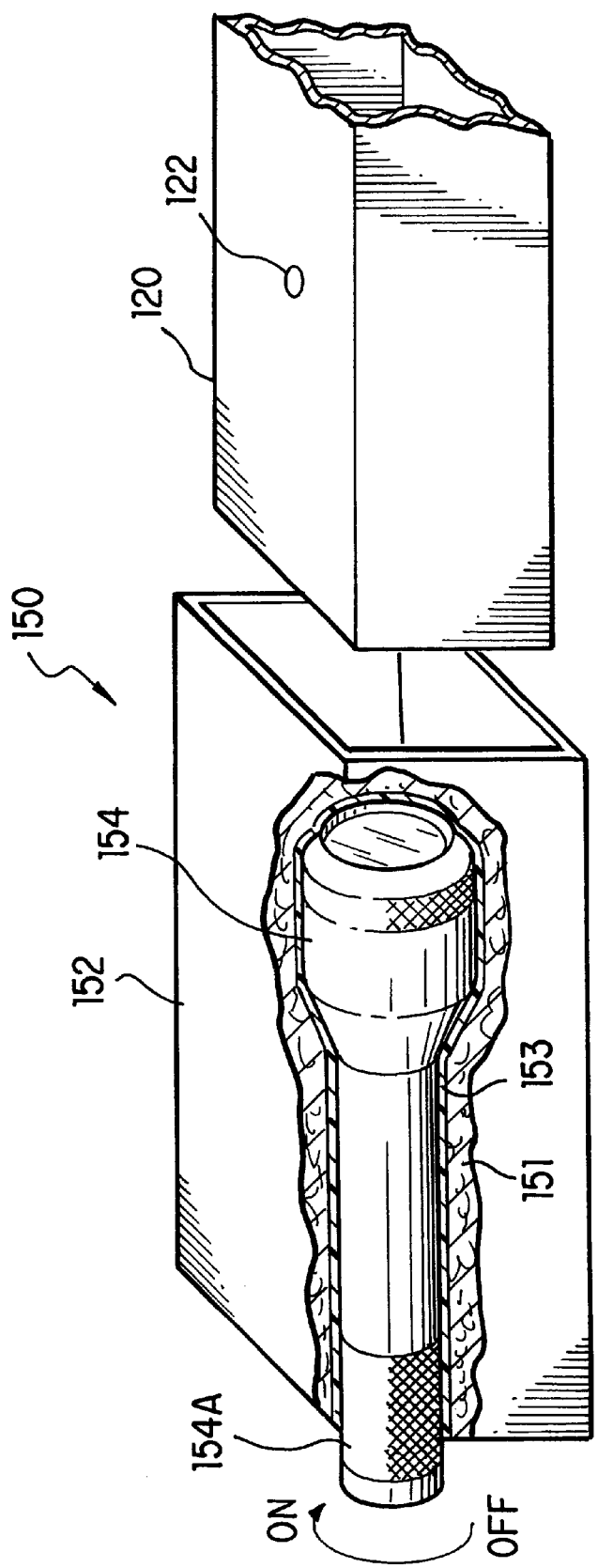
FIG. 5 illustrates an embodiment for an illumination assembly of the present invetion.

FIG. 5 provides further detail for the configuration of illumination assembly 150. As can be seen, and as was described earlier, illumination assembly 150 includes enclosure 152 and flashlight 154. Enclosure 152 is slightly larger than the size of first arm 120, therefore, enclosure 152 is able to be positioned on first arm 120. Enclosure 152 may be secured to first arm 120 through use of any of a variety of fastening devices, such as screws. As discussed previously, flashlight 154 is contained within enclosure 152 and is positioned such that it is able to illuminate the internal area of first arm 120. Thus, flashlight 154 is able to illuminate the apertures that are included in first arm 120 which are to be aligned with the respective aperture that is included in support arm 140. Aperture 122 of first arm 120 is illustrated in FIG. 5 which is illuminated by flashlight 154.

In order to maintain the relative positioning of flashlight 154 within enclosure 152, enclosure 152 may be filled with a fill material 151, such as fiberglass, around flashlight 154. Fiberglass 151 fills the interior volume of enclosure 152 around flashlight 154 in order to support flashlight 154 within enclosure 152. In order to be able to rotate flashlight base 154A, which turns the flashlight on and off, a lubricant 153, e.g., petroleum jelly, is provided around flashlight base 154A. By providing petroleum jelly 153 around flashlight base 154A, the flashlight base 154A is not restrained against rotation by fiberglass fill 151. Thus, as described above and as can be understood, the illumination assemblies provide an apparatus for holding an illumination device and positioning the illumination device such that it provides for illuminating the apertures in the arms 120, 125, and 140 of the platforms which assists in aligning the apertures of the arms, and thus connecting the arms of the platforms.

Also included on upper platform 100 is blade 160. Blade 160 is configured as a solid, single-piece member on that is attached to upper bracket 114 of base frame 110. As a single-piece member, blade 160 has a continuous surface between opposing ends of blade 160. Thus, blade 160 is able to engage with tree trunks that may have minimal widths. Blade 160 may be formed from any of a variety of materials, including steel or aluminum. Blade 160 may have a sharpened end which engages with the tree in order to securely engage blade 160 with the tree trunk. Thus, by comprising blade 160 as a solid, single structural member, the blade is able to engage with tree trunks of a wide variety of widths and is able to provide for a stable upper platform 100 for the hunter. Blade 160 may extend a distance of ¾ of an inch outward from upper bracket 114 and may have an overall length of 11½ inches.

Upper platform 100 also includes gun rack 170. Gun rack 170 is included on base frame 110 at an opposing end of base frame 110 from blade 160. Gun rack 170 includes a first gun rack bracket 172 and a second gun rack bracket 174. Thus, while climbing the tree, the hunter is able to position his/her gun within gun rack 170 to secure the gun to the upper platform 100. A gun retainer 176, which may be a Velcro® strap, may be provided to retain the gun within the gun rack 170.

Figure 6:
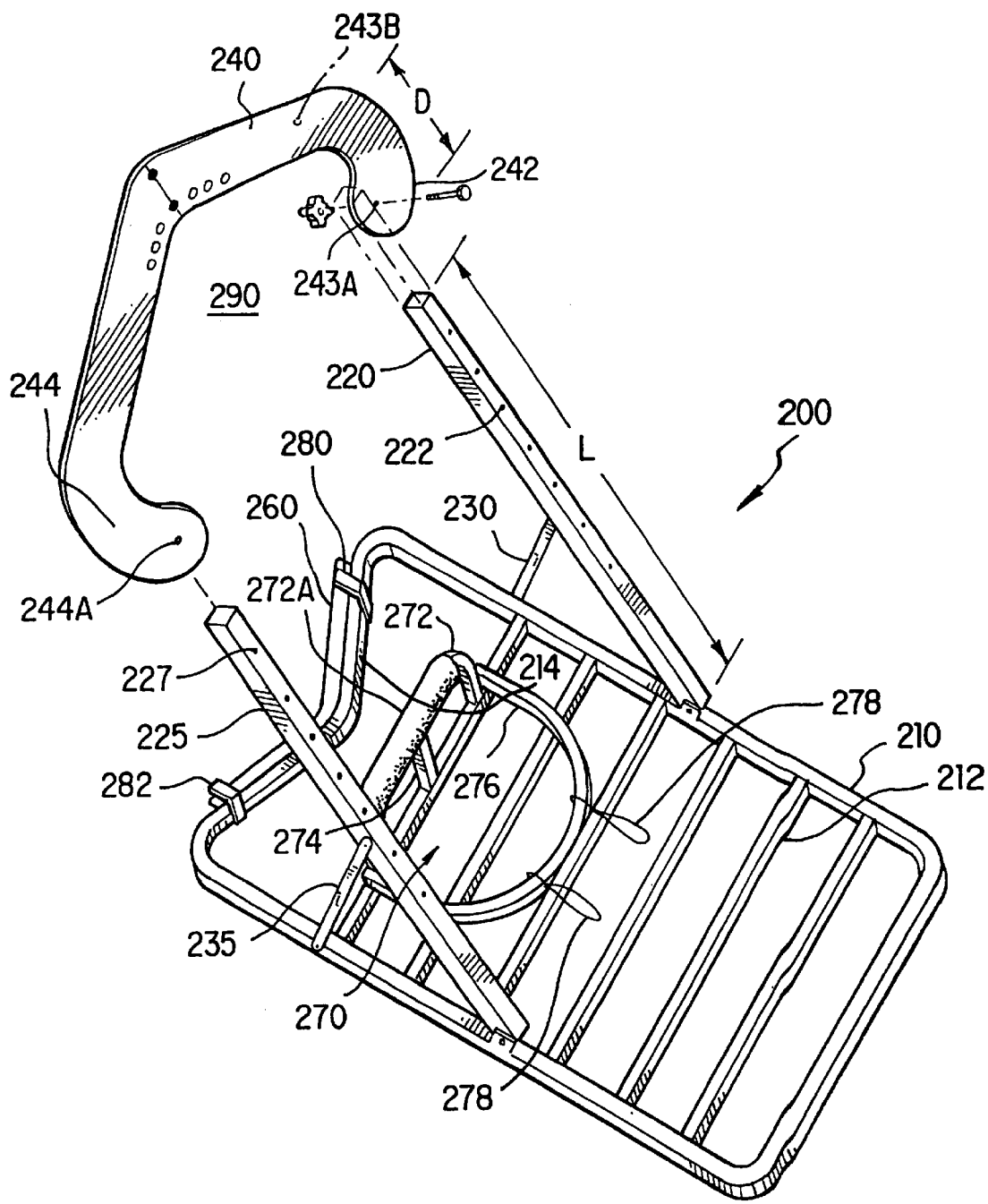
FIG. 6 is a partially exploded perspective view of an embodiment of a lower platform in accordance with the principles of the present invention.

FIG. 6 illustrates lower platform 200. Lower platform 200 is formed somewhat similar to upper platform 100 with the primary exception being that lower platform 200 includes foot support brackets 212 for supporting the feet, and thus the weight, of the hunter when standing on lower platform 200 and also includes foot support lifting bracket 270, as will be described further later in this specification.

Lower platform 200, like upper platform 100, includes a base frame 210, first and second arms 220, 225, respectively, a support arm 240, and a blade 260. Whereas FIG. 6 does not illustrate lower platform 200 including illumination assemblies as described in connection with upper platform 100, it is to be understood that the lower platform 200 may also include illumination assemblies as described previously.

Base frame 210 is also generally rectangularly-shaped, as was base frame 110 of upper platform 100. Base frame 210 has a width of approximately 20 inches and a length of approximately 32⅝ inches. Base frame 210 may be formed from aluminum tubular members. Base frame 210 includes foot support brackets 212 which extend across the width of base frame 210. Foot support brackets 212 provide for supporting the feet of the hunter.

Lower platform 200 also includes first arm 220 and second arm 225. Both arms are pivotally attached to base frame 210 and thus may be pivoted between an extended configuration, as illustrated in FIG. 6, and a folded configuration where the arms lie parallel to base frame 210. First locking hinge 230 provides for extending and folding first arm 220 and second locking hinge 235 provides for extending and folding second arm 225. The locking hinges may be formed as described previously for the locking hinges of upper platform 100. First arm 220 includes a plurality of apertures 222 and second arm 225 also includes a plurality of apertures 227 which provide for joining support arm 240 to arms 220, 225, as was described in connection with upper platform 100.

Support arm 240 is configured similarly to support arm 140 of the upper platform 100. Thus, among other features, support arm 240 includes a first curved portion 242 and a second curved portion 244 at its distal-most ends.

In further describing the complementary configuration between support arm 240 and arms 220, 225, which is similar to that which was discussed previously in connection with support arm 140 and arms 120, 125 of upper platform 100, it can be seen that in order to accommodate a tree having a trunk with a particular width, a trunk receiving area 290 must be provided within lower platform 200 between support arm 240 and base frame 210. In order to provide this receiving area 290, it can be understood that support arm 240 must be joined to arms 220, 225 by aligning apertures 243A and 244A of support arm 240 with appropriate apertures provided in first arm 220 and second arm 225, respectively.

As can be understood, because aperture 243A is positioned as it is on support arm 240, receiving area 290 may be maintained by aligning aperture 243A with one of apertures 222. If aperture 243A was not positioned on support arm 240 as it is in the present invention, but rather was positioned as it is in the prior art and located on support arm 240 at a location as illustrated for aperture 243B, it can be understood that to maintain the same receiving area 290, the length L of first arm 220 would have to be extended (shown in phantom in FIG. 6) a distance D such that an aperture on arm 220 could align with aperture 243B on support arm 240. Thus, arm 220 would have to be extended a distance at least equal to the distance between apertures 243A and 243B. This distance D is a representative distance of about 6 inches. Thus, because of the physical configuration of support arm 240 in the present invention, the length of first arm 220 may be shortened by a distance of approximately 6 inches while still maintaining the receiving area 290 to a defined dimension. By providing curved portions on support arm 240, the apertures 243A and 244A may be extended a distance of approximately 6 inches on support arm 240 which in-turn allows for the length of arms 220, 225 to be shortened by that same distance which then allows for a more-compact profile of the platforms when disassembled for carrying and transport by the hunter.

Due to the complementary configurations of support arm 240 and arms 220, 225, the arms 220, 225 have a representative length of 30 and 5/8 inches. Again, as described above, if support arm 240 was not formed as in the present invention, arms 220, 225 would be required to be lengthened by a distance of approximately 6 inches which would result in an overall length of approximately 37 inches.

As mentioned previously, lower platform 200 also includes foot support lifting bracket 270. Foot support lifting bracket 270 provides for accommodating the boots of the hunter such that the hunter is able to position his/her boots within foot support lifting bracket 270 in order to engage and lift the lower platform 200 with his/her boots as he/she is climbing the tree with the lower platform attached to his/her boots. Foot support lifting bracket 270 can also be seen in FIGS. 7 and 8.

Foot support lifting bracket 270 is comprised of a rigid, non-flexible structure and includes an upper support bracket 272 which is generally formed in an inverted u-shape and which is attached to one of the foot support brackets 212 at its opposed ends. Upper support bracket 272 extends in a first plane generally perpendicular to base frame 210. Upper support bracket 272 is a rigid structure and may be comprised of the same of type of aluminum tubular member that is utilized to comprise base frame 210 and foot support brackets 212. Sufficient distance is provided between foot support bracket 212 and the upper end of upper support bracket 272 such that a hunter is able to slide the toe portion of his/her boots between upper support bracket 272 and foot support brackets 212. The ends of upper support bracket 272 may be welded or otherwise rigidly attached to foot support bracket 212. Thus, upper support bracket 272 is a rigid structure that maintains its configuration such that the hunter is easily able to position his/her boots between the upper support bracket 272 and foot support bracket 212. The inverted u-shape for upper support bracket 272, and the securing of the ends of the upper support bracket 272 on one of the foot support brackets 212, provides a structure that keeps the hunter's boots from sliding from side-to-side on base frame 210 when the hunter's boots are positioned within foot support lifting bracket 270.

A separator bracket 274 may be provided between upper support bracket 272 and foot support bracket 212 in order to provide separate areas for accommodation of each of the boots of the hunter within upper support bracket 272. Like upper support bracket 272, separator bracket 274 is also a rigid structure and is rigidly attached to upper support bracket 272 at its upper end and to foot support bracket 212 at its lower end. A pad 272A, which may be, for example, foam rubber, may be provided along upper support bracket 272 in order to provide for comfort and enhanced contact between the hunter's boots and the upper support bracket 272.

Foot support lifting bracket 270 also includes a rear support bracket 276 which is also a rigid member that may be comprised of an aluminum tubular structure. Again, it is desirable that rear support bracket 276 be a rigid structure so that it maintains its shape and is easy for the hunter to slip his/her boots into. Rear support bracket 276 extends in a second plane generally perpendicular to the first plane of upper support bracket 272. Rear support bracket 276 is formed in a gently curving configuration to provide for both easy insertion of the hunter's boots within the rear support bracket 276 and engagement with the rear of the hunter's boots to ensure that the boots remain securely retained with the foot support lifting bracket 270 when the hunter is climbing a tree.

To assist in the positioning of rear support bracket 276 with respect to a particular hunter's boots, pivot joints 273 may be provided on each end of rear support bracket 276 such that rear support bracket 276 may be variably positioned with respect to both upper support bracket 272 and foot support brackets 212.

Retention straps 278 may be provided on rear support bracket 276. Retention straps 278 may be comprised of a flexible material and may be utilized, if desired, by the hunter to further secure foot support lifting bracket 270 to the boots of the hunter. However, because of the rigid structure of foot support bracket 270, the hunter is able to easily position and maintain his/her boots within the structure of the foot support lifting bracket 270 and thus retention straps 278 are most-likely not utilized.

Thus, upper support bracket 272 and rear support bracket 276 provide a rigid structure that enables a hunter to easily insert his/her boots into foot support lifting bracket 270, retains the hunter's boots within bracket 270, and does not require positioning and assembling of the bracket 270 around the boots of the hunter.

Figure 7:
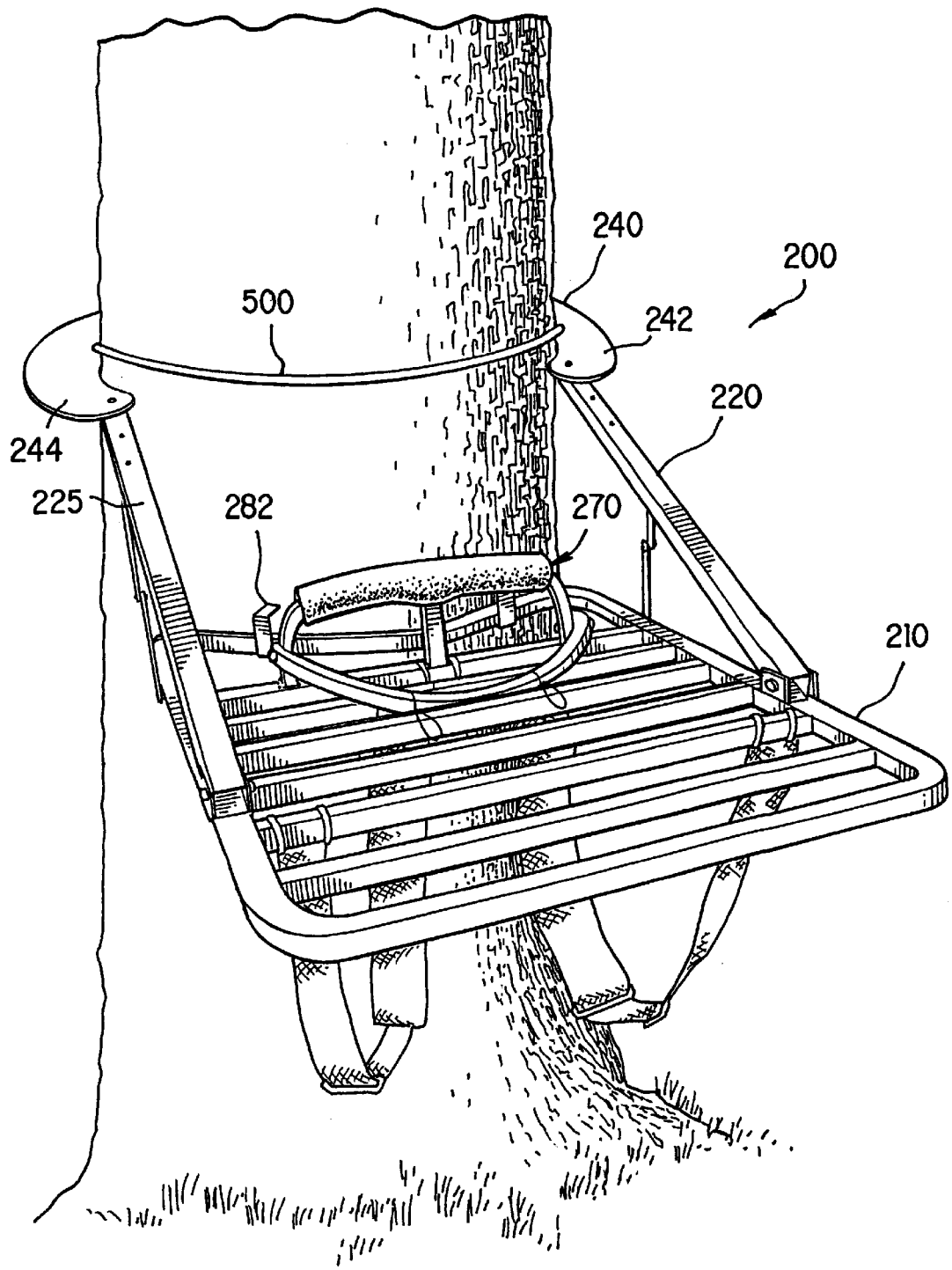
FIG. 7 is another perspective view of the lower platform of FIG. 6.
Figure 8:
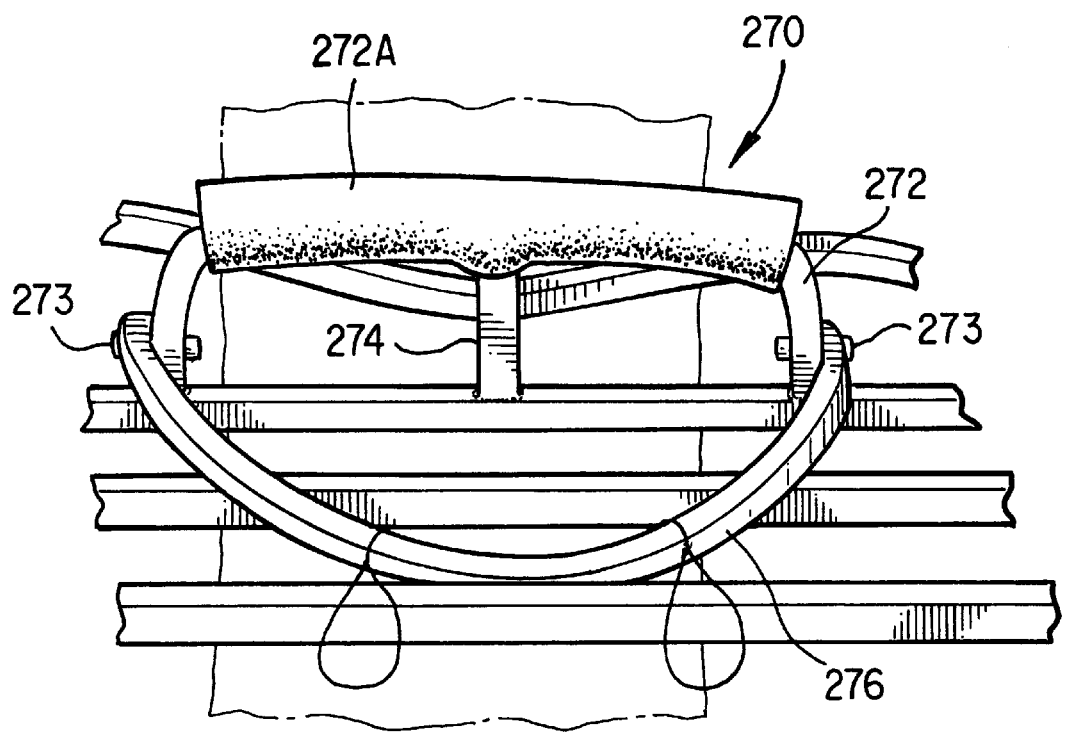
FIG. 8 is a perspective view of the foot support lifting bracket of FIGS. 6 and 7.

In another feature of the present invention, as can be seen in FIG. 7, a safety strap 500 may be provided on lower platform 200. The safety strap 500 engages with a side of the support arm 240 and wraps around the tree to engage with an opposing side of the support arm 240. The safety strap 500 is utilized to help to ensure engagement of the platform with the tree. Safety straps may be provided on both the lower platform 200 and the upper platform 100.

Lower platform 200 also includes storage brackets that are included on upper bracket 214 of base frame 210. First storage bracket 280 is formed similarly to second storage bracket 282. Each storage bracket is formed such that when it is attached to upper bracket 214, it forms a unshaped support structure in conjunction with upper bracket 214. As will be explained further later in this specification, when the upper and lower platforms are disassembled from the tree, upper bracket 114 of upper platform 100 may be positioned within first and second storage brackets 280, 282, respectively, of lower platform 200 in order to provide for ease of transportation of the upper and lower platforms by the hunter. Because the storage brackets are provided on base frame 210 of lower platform 200 and the base frame 110 of upper platform 100 is positioned into the storage brackets, it is easy to couple the two platforms together for carrying and transport by the hunter.

Whereas it is described that the storage brackets are included on lower platform 200 for receipt of upper platform 100 within them, the present invention is not limited to only including storage brackets on the lower platform for receipt of the upper platform. The present invention may also be practiced by including the support brackets on the upper platform for receipt of the lower platform within them. Additionally, whereas the storage brackets are illustrated as being included on the top side of base frame 210, i.e., the side that the hunter would stand on, depending upon the physical dimensions of a particular embodiment of the tree stand of the present invention, it may be preferable to attach the brackets on the underside of base frame 210. In the described embodiments it is desirable to attach the brackets on the underside, but for purposes of visualization in the drawing figures, the brackets are illustrated as being included on the top side of base frame 210.

Lower platform 200 also includes blade 260. Blade 260 is formed similar to blade 160 that was described in connection with upper platform 100.

Other representative dimensional data for lower platform 200 is as provided below. Blade 260 may have an overall length of 14½ inches and may extend from upper bracket 214 a distance of ¾ inch toward the tree. Support arm 240 has an end to end width of approximately 25½ inches and has a depth from the distal-most ends of the curved portions to the distal-most portion of the v-shaped configuration of 15¼ inches. Support arm 240 may be comprised of a member that is 3 inches in width. As with the embodiment for upper platform 100, the apertures in support arm 240 are positioned approximately 1 inch from the distal-most end of the support arm.

Figure 9:
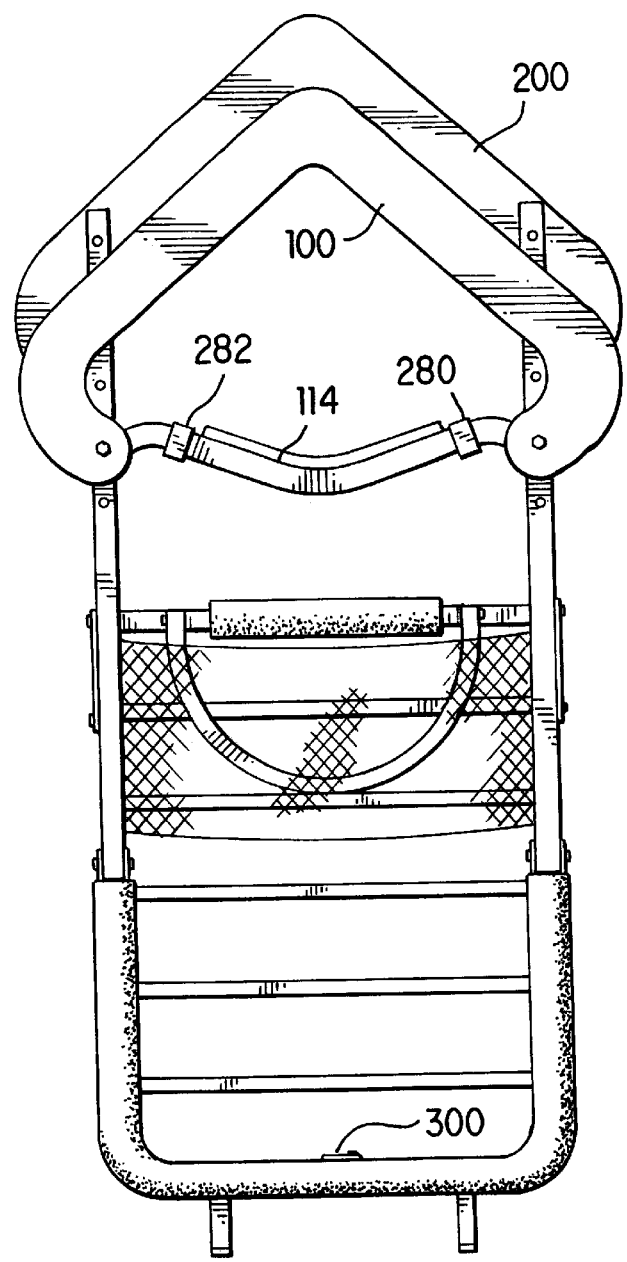
FIG. 9 illustrates the upper and lower platforms as joined together by utilizing an embodiment of the storage brackets and swing c-clamp in accordance with the principles of the present invention.
Figure 10:
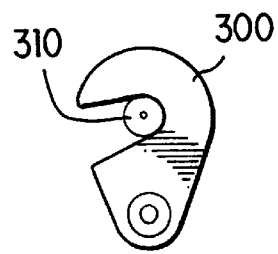
FIG. 10 is a side view of the swing c-clamp of FIG. 9.

FIG. 9 illustrates a carrying and transport configuration for the upper platform 100 and the lower platform 200 when they are coupled together by utilizing storage brackets 280 and 282. As can be seen, and as described earlier, upper bracket 114 of upper platform 100 is received within storage brackets 280 and 282 of lower platform 200. Thus, the two platforms may be easily coupled together which provides for ease of carrying and transport for the hunter. At the bottom-most end of the two platforms a swing c-clamp may be provided to join the two platforms together at this lower-most end. Swing c-clamp 300 is further illustrated in FIG. 10. Swing c-clamp 300 is pivotally connected to one platform and an engagement member 310 may be provided on the other platform. In one embodiment, engagement member 310 may be a pin. Thus, when the two platforms are coupled together with brackets 280 and 282, the two platforms may be further joined together by interconnecting swing c-clamp 300 around pin 310. This will provide for further securing of the two platforms together which will provide for easy carrying and transport of the deer stand 10. The present invention is not limited to including swing c-clamp on a particular one of the platforms and the engaging pin 310 on the other of the platforms. The present invention may be practiced by pivotally connecting swing c-clamp 300 on either of the two platforms with pin 310 being provided on the other of the two platforms.

As can also be seen in FIG. 9, due to the shorter length of the arms of each of the platforms in the present invention, as described earlier, it can be seen that the shorter length arms provide for a more compact package when the deer stand 10 is disassembled and the two platforms are coupled together for carrying and transport. As can be understood, if the arms of each platform were lengthened beyond that which they are required to be in the present invention, the overall physical size of the disassembled deer stand would be greater, thus resulting in a larger structure for carrying and transport by the hunter.

Figure 11:
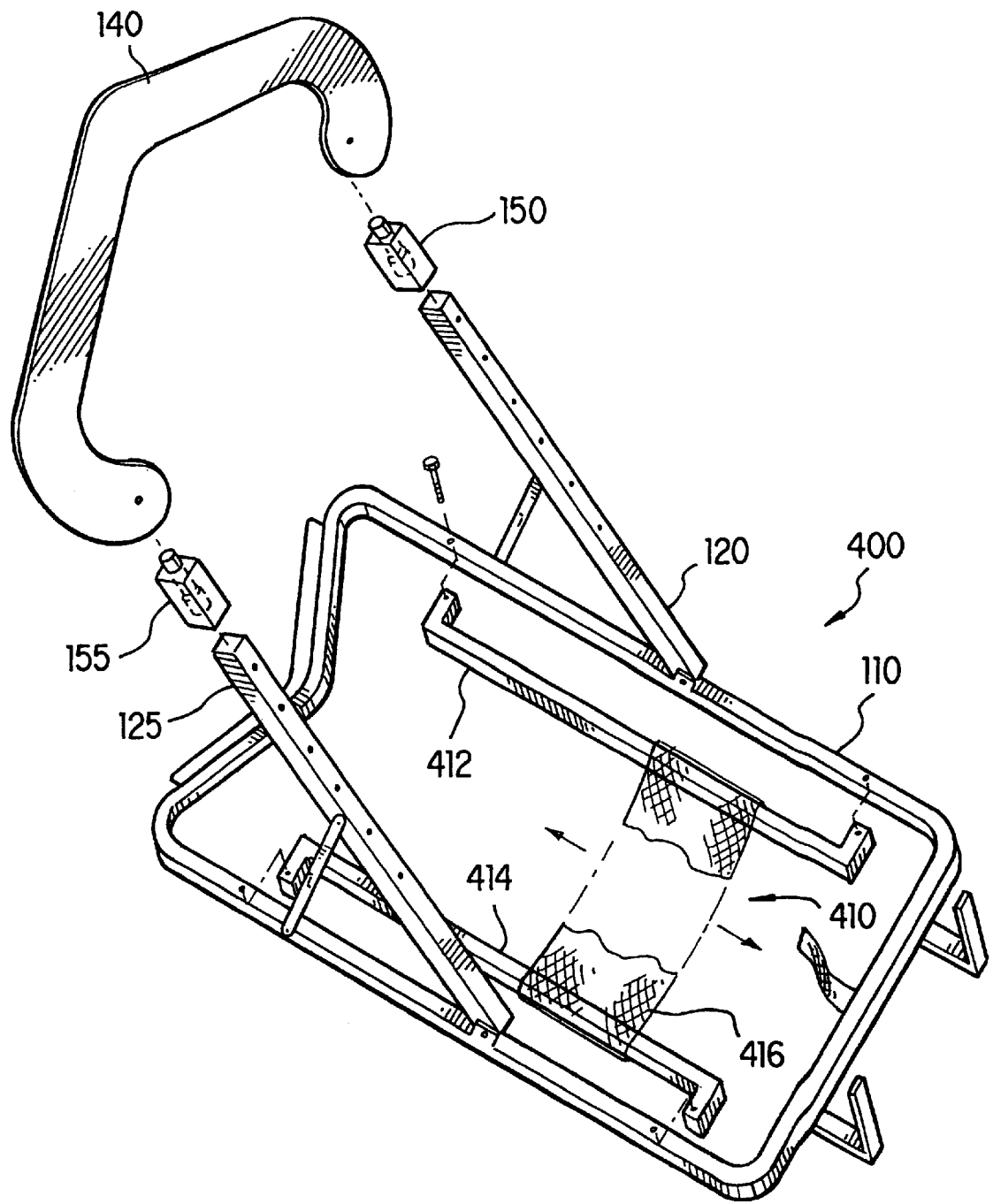
FIG. 11 is a partially exploded perspective view of a second embodiment of an upper platform including a sliding seat assembly in accordance with the principles of the present invention.

FIG. 11 illustrates an alternative embodiment for upper platform 400 in accordance with the principles of the present invention. The embodiment of FIG. 11 for upper platform 400 is similar to that described for upper platform 100 with the exception that a sliding seat assembly 410 is included in upper platform 400. Components of upper platform 400 that are similar to those of the previously described embodiment of upper platform 100 are designated with like reference numerals in FIG. 11. Sliding seat assembly 410 includes a first seat bracket 412 and a second seat bracket 414. Each of the seat brackets extend inward from base frame 110 a distance of about 1½ inches and extend for a length of approximately 24 inches. Each seat bracket 412, 414 may also be comprised of a tubular member, as previously described for the other components of the platforms, and may be either circular or rectangular in cross-section. Seat 416 is slidably mounted on seat brackets 412, 414. Seat 416 may be comprised of any of a variety of different structures and the present invention is not limited to any particular structure for seat 416. For example, seat 416 could be a mesh seat that is able to slide along seat brackets 412, 414. Alternatively, a solid, rigid structure may be utilized for seat 416 that is also able to slide along brackets 412, 414 in the directions as indicated by the arrows in FIG. 11. Thus, by providing a sliding seat assembly in upper platform 400, the positioning of the seat may be adjusted to accommodate hunters of different sizes comfortably.

Several alternative embodiments are contemplated in the present invention. For example, swaged bushings may be provided within the apertures that are included within the arms of both the upper and lower platforms, e.g., apertures 122 in first arm 120 of upper platform 100. The swaged bushings could be press-fitted within the apertures and would still accommodate connection hardware within them to provide for connecting, or example, support arm 140 to first arm 120 of upper platform 100. The swaged bushings within the apertures could provide for quieter interconnection of the support arm 140 with arm 120 with the connection hardware. The less noise that is made when assembling the deer stand the more beneficial for the hunter since it is less likely that potential prey will be disturbed and alerted to the hunter's presence.

As described above, swaged bushings may be included in all connection apertures in the platforms in order to provide not only for quieter assembling but for increased strength of the assembled tree stand.

If swaged bushings were provided within the apertures as described above, it may be required that a different configuration for the illumination assemblies be provided. That is, if the illumination assemblies were attached to the distal end of the arms, even though the light from the illumination assemblies would still shine through the tubular support arms, the flashlight would possibly not illuminate the apertures due to the additional structure of the bushings being placed within the apertures. Thus, it may be desirable to mount each illumination assembly such that it is provided on top of an arm, e.g., arm 120, such that it illuminates the aperture from above. The illumination assembly, in this embodiment, could be provided at an opposite end of arm 120, i.e., the end opposite the end that engages with the support arm. In this position, the illumination assembly will not interfere with the positioning of the support arm with respect to the arm, however, it will still be able to illuminate the aligned apertures for joining of the support arm to the arm.

As a further alternative embodiment, even in an embodiment where bushings are not utilized within the apertures as described above, it is not necessary to attach the illumination assemblies to the distal ends of the arms. All that is required is that the illumination assemblies be attached to a portion of the platforms such that the illumination assemblies are able to illuminate the aligned apertures of the support arms and the arms of the platforms. Thus, for example, an illumination assembly could be attached to an underside of, for example, support arm 140 where, when support arm 140 was aligned with arm 120, the illumination assembly would still be able to illuminate the aligned apertures.

It is not even required that two illumination assemblies be provided for each platform. It is contemplated that only one illumination assembly could be utilized. This one illumination assembly would be used to align one side of support arm 140, for example, with first arm 120. By utilizing the illumination assembly to align support arm 140 with one of arms 120, 125, because of the similar configuration and dimensions of the arms 120, 125, alignment of one of arms 120, 125 with support arm 140 would result in the other of the arms also being aligned with support arm 140. Thus, it is contemplated that only one illumination assembly could be utilized with each of the upper and lower platforms.

In this specification, the dimensions of the upper and lower platforms are representative dimensions only and the principles of the present invention may be practiced by utilizing any of a variety of different dimensional sizes for the components described for the tree stand.

It is preferred that the upper and lower platforms of the present invention be comprised of aluminum structural members. By utilizing such materials, the tree stand of the present invention is able to support a much heavier weight than are currently known tree stands. For example, the tree stand of the present invention is able to support a weight of approximately 350 pounds whereas tree stands as known in the prior art may only be able to support a weight of approximately 250 pounds. However, the tree stand of the present invention may itself only weigh between 13 to 15 pounds.

The disclosed embodiments are illustrative of the various ways in which the present invention may be practiced. Other embodiments can be implemented by those skilled in the art without departing from the spirit and scope of the present invention.

What is claimed is:

1. A tree stand, comprising:
   a first platform, said first platform including:
   a base frame;
   a first arm and a second arm, said first and second arms pivotally attached to said base frame;
   a support arm, said support arm including curved portions at opposed distal ends thereof, said curved portions having a hooked shape;
   said first and second arms releasably engageable with said support arm;
   first and second illumination assemblies, said first illumination assembly attached to a distal end of said first arm and said second illumination assembly attached to a distal end of said second arm; and
   a blade attached to an upper bracket of said base frame; and
   a second platform, said second platform including:
   a base frame;
   a first arm and a second arm, said first and second arms pivotally attached to said base frame;
   a support arm, said support arm including curved portions at opposed distal ends thereof, said curved portions having a hooked shape;
   said first and second arms releasably engageable with said support arm;
   first and second illumination assemblies, said first illumination assembly attached to a distal end of said first arm and said second illumination assembly attached to a distal end of said second arm;
   a blade attached to an upper bracket of said base frame; and
   a foot support lifting bracket attached to said base frame, said foot support lifting bracket comprised of a rigid, non-flexible structure.

2. The tree stand of claim 1 wherein said curved portions of said support arms of said first and second platforms have a continuously curving configuration along an entire length thereof.

3. The tree stand of claim 1 wherein said support arms of said first and second platforms include a first portion and a second portion, said first portion pivotally joined to said second portion by an adjustment joint.

4. The tree stand of claim 1 further comprising a seat assembly attached to said base frame of said first platform, said seat assembly including:
   a first bracket;
   a second bracket; and
   a seat slidingly disposed on said first and second brackets.

5. The tree stand of claim 1 further comprising:
   a first storage bracket attached to said upper bracket of said base frame of one of said first platform and said second platform;
   a second storage bracket attached to said upper bracket of said base frame of said one of said first platform and said second platform;
   a swing c-clamp attached to an end of said base frame of one of said first and second platforms; and
   an engagement member attached to an end of said base frame of the other of said first and second platforms.

6. The tree stand of claim 1 wherein said blades of said first and second platforms are comprised of a single-piece structural member.

7. A tree stand platform, comprising:
   a base frame;
   a first arm and a second arm, said first and second arms both attached to said base frame; and
   a support arm, said support arm releasably attachable to said first and second arms and including a first and second curved portion at opposed distal ends of said support arm;
   wherein said first and second curved portions have a hooked shape which converge toward each other.

8. The tree stand of claim 7 wherein said first and second curved portions of said support arm have a continuously curving configuration along an entire length thereof.

9. The tree stand of claim 8 wherein said support arm includes a first portion and a second portion, said first portion pivotally joined to said second portion by an adjustment joint.

10. The tree stand of claim 9 wherein said adjustment joint includes a pivot member disposed through said first portion and said second portion at an outer surface of said support arm and a pin adjustably disposed through said first portion and said second portion at an inner surface of said support arm.

11. The tree stand of claim 7, further comprising:
   a blade attached to an upper bracket of said base frame, said blade comprised of a single-piece structural member.

12. A tree stand platform, comprising:
a base frame;
a first arm and a second arm, said first and second arms both defining an aperture therein and attached to said base frame;
a support arm, said support arm having a first distal end and a second distal end with each distal end defining an aperture therein;
wherein when in an operative configuration, said aperture of said first arm aligns with said aperture of said first distal end of said support arm and said aperture of said second arm aligns with said aperture of said second distal end of said support arm; and
an illumination assembly, said illumination assembly attached to one of said first arm and said first distal end of said support arm and wherein in an operative configuration said illumination assembly illuminates the aligned apertures of said first arm and said first distal end of said support arm;
wherein said illumination assembly is attached to a distal end of said first arm;
wherein said illumination assembly includes:
an enclosure, said enclosure attached to said distal end of said first arm;
a flashlight disposed within said enclosure;
a fill material disposed within said enclosure and disposed around at least a portion of said flashlight; and
a lubricant disposed between said at least a portion of said flashlight and said fill material.

13. The tree stand of claim 12 wherein said fill material is fiberglass.

14. The tree stand of claim 12 further comprising a second illumination assembly, said second illumination assembly attached to one of said second arm and said second distal end of said support arm and wherein in an operative configuration said second illumination assembly illuminates the aligned apertures of said second arm and said second distal end of said support arm.

15. A tree stand platform, comprising:
a base frame;
a first arm and a second arm, said first and second arms both attached to said base frame;
a support arm, said support arm releasably attachable to said first and second arms; and
a foot support lifting bracket attached to said base frame, said foot support lifting bracket comprised of a rigid, non-flexible structure;
wherein said foot support lifting bracket includes:
an inverted u-shaped upper support bracket;
a separator bracket rigidly attached to said base frame at a first end and said upper support bracket at a second end; and
a rear support bracket pivotally connected to said upper support bracket;
wherein said upper support bracket, said separator bracket, and said rear support bracket are comprised of aluminum tubular members.

16. The tree stand of claim 15 wherein said upper support bracket extends in a first plane and said rear support bracket extends in a second plane, said first plane perpendicular to said second plane.

17. The tree stand of claim 15 further comprising first and second flexible retention straps attached to said rear support bracket.

18. The tree stand of claim 15 further comprising a pad disposed around at least a portion of said upper support bracket.

19. A tree stand, comprising:
a first platform, said first platform including: a base frame; and a support arm, said support arm including curved portions at opposed distal ends thereof, said curved portions having a hooked shape which converge toward each other;
a second platform, said second platform including: a base frame; and a support arm, said support arm including curved portions at opposed distal ends thereof, said curved portions having a hooked shape which converge toward each other;
a support bracket attached to said base frame of one of said first platform and said second platform and wherein when said first platform and said second platform are in a carrying and transport configuration said first platform is coupled to said second platform by disposing a portion of said base frame of the other of said first platform and said second platform into said support bracket.

20. The tree stand of claim 19 wherein said support bracket is attached to an upper bracket of said base frame of said one of said first platform and said second platform.

21. The tree stand of claim 19 further comprising a swing c-clamp attached to an end of said base frame of one of said first platform and said second platform; and
an engagement member attached to an end of said base frame of the other of said first platform and said second platform;
said swing c-clamp and said engagement member disposed on an opposite end of said base frames from said upper bracket.

22. A tree stand, comprising:
a first platform, said first platform including:
a base frame;
a first arm and a second arm, said first and second arms pivotally attached to said base frame;
a support arm, said support arm including curved portions at opposed distal ends thereof;
said first and second arms releasably engageable with said support arm;
first and second illumination assemblies, said first illumination assembly attached to a distal end of said first arm and said second illumination assembly attached to a distal end of said second arm; and
a blade attached to an upper bracket of said base frame; and
a second platform, said second platform including:
a base frame;
a first arm and a second arm, said first and second arms pivotally attached to said base frame;
a support arm, said support arm including curved portions at opposed distal ends thereof;
said first and second arms releasably engageable with said support arm;
first and second illumination assemblies, said first illumination assembly attached to a distal end of said first arm and said second illumination assembly attached to a distal end of said second arm;
a blade attached to an upper bracket of said base frame; and
a foot support lifting bracket attached to said base frame, said foot support lifting bracket comprised of a rigid, non-flexible structure;
wherein said first and second illumination assemblies of said first and second platforms include:
an enclosure;

a flashlight disposed within said enclosure;
fiberglass disposed within said enclosure and disposed around at least a portion of said flashlight; and
a lubricant disposed between said at least a portion of said flashlight and said fiberglass.

23. A tree stand, comprising:
a first platform, said first platform including:
 a base frame;
 a first arm and a second arm, said first and second arms pivotally attached to said base frame;
 a support arm, said support arm including curved portions at opposed distal ends thereof;
 said first and second arms releasably engageable with said support arm;
 first and second illumination assemblies, said first illumination assembly attached to a distal end of said first arm and said second illumination assembly attached to a distal end of said second arm; and
 a blade attached to an upper bracket of said base frame; and
a second platform, said second platform including:
 a base frame;
 a first arm and a second arm, said first and second arms pivotally attached to said base frame;
 a support arm, said support arm including curved portions at opposed distal ends thereof;
 said first and second arms releasably engageable with said support arm;
 first and second illumination assemblies, said first illumination assembly attached to a distal end of said first arm and said second illumination assembly attached to a distal end of said second arm; and
 a blade attached to an upper bracket of said base frame; and
 a foot support lifting bracket attached to said base frame, said foot support lifting bracket comprised of a rigid, non-flexible structure;
 wherein said foot support lifting bracket includes:
  a unshaped upper support bracket;
  a separator bracket rigidly attached to said base frame at a first end and said upper support bracket at a second end; and
  a rear support bracket pivotally connected to said upper support bracket;
  wherein said upper support bracket, said separator bracket, and said rear support bracket are comprised of aluminum tubular members.

24. A tree stand, comprising:
a first platform, said first platform including:
 a base frame;
 a first arm and a second arm, said first and second arms pivotally attached to said base frame;
 a support arm, said support arm including curved portions at opposed distal ends thereof, said first and second arms releasably engageable with said support arm;
 first and second illumination assemblies, said first illumination assembly attached to a distal end of said first arm and said second illumination assembly attached to a distal end of said second arm; and
 a blade attached to an upper bracket of said base frame; and
a second platform, said second platform including:
 a base frame;
 a first arm and a second arm, said first and second arms pivotally attached to said base frame;
 a support arm, said support arm including curved portions at opposed distal ends thereof;
 said first and second arms releasably engageable with said support arm;
 first and second illumination assemblies, said first illumination assembly attached to a distal end of said first arm and said second illumination assembly attached to a distal end of said second arm;
 a blade attached to an upper bracket of said base frame; and
 a foot support lifting bracket attached to said base frame, said foot support lifting bracket comprised of a rigid, non-flexible structure;
 wherein each of said first and second arms of said first and second platforms are pivotally attached to said base frames of said first and second platforms by a locking hinge, said locking hinge including:
  a first support member defining an aperture therein;
  a second support member defining a first aperture therein, said second support member pivotally attached to said first support member; and
  a lock attached to said second support member, said lock including:
   a leaf spring attached at a first end to said second support member;
   a locking head disposed at a second end of said leaf spring; and
   a push pin attached to said leaf spring and disposed through a second aperture included in said second support member;
 wherein when said first support member and said second support member are in a locked configuration, said locking head is disposed through said aperture included in said first support member and said first aperture included in said second support member.

* * * * *

UNITED STATES PATENT AND TRADEMARK OFFICE
CERTIFICATE OF CORRECTION

PATENT NO. : 6,345,690 B1
DATED : February 12, 2002
INVENTOR(S) : Philip E. Morris It is certified that error appears in the above-identified patent and that said Letters Patent is hereby corrected as shown below:

Column 3,
Line 50, change "invention" to -- invention --.

Column 12,
Line 35, change "or example" to -- for example --.

Signed and Sealed this

Twenty-third Day of July, 2002

Attest:

Attesting Officer

JAMES E. ROGAN
Director of the United States Patent and Trademark Office